July 14, 1936.     P. W. BEGGS     2,047,764
VALVE ADAPTER
Filed July 20, 1932
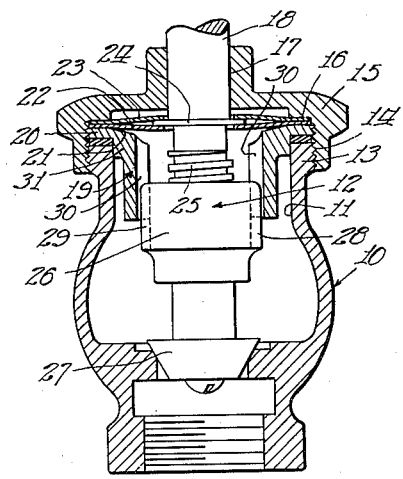
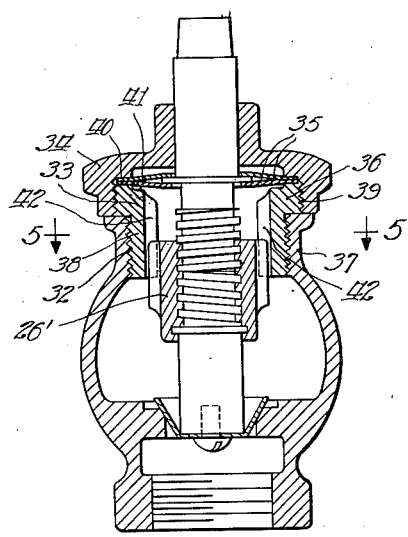
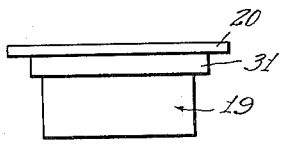
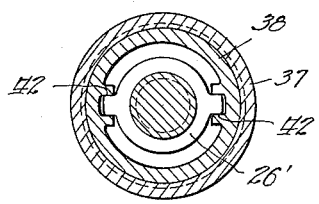
Witness:
V. Silgander
Inventor
Paul W. Beggs
By Hill & Hill Attys Patented July 14, 1936

2,047,764

UNITED STATES PATENT OFFICE 2,047,764

VALVE ADAPTER

Paul W. Beggs, Chicago, Ill., assignor to Jas. P. Marsh Corporation, Chicago, Ill., a corporation of Illinois Application July 20, 1932, Serial No. 623,538

2 Claims. (Cl. 251—31)

The invention relates to improvements in valves and particularly to a member providing an adapter designed to provide means for associating a valve device and packing means for the stem of the valve with the bonnet and body of said valve, the body having either internally or externally arranged threads for connecting the bonnet of the valve with the body. It is an object of the invention to provide a device capable of being associated with valve bodies having the threads for associating the bonnet with the body arranged either interiorly or exteriorly of the body, the device having means for holding packing discs in functionally operative position and in addition provides guide means for an element for actuating said valve.

A further object of the invention is to construct a device to provide an element having means at one end adapted to be arranged in the bonnet of the valve and be located between the body and the bonnet and operate to hold packing means such as discs in functionally operative position with respect to said valve and provide guide means for an element of said valve.

The invention has these and other objects, all of which will be explained in detail and more readily understood when read in conjunction with the accompanying drawing which illustrates various embodiments of which the invention is susceptible, it being therefore manifest that other arrangements may be resorted to without departing from the spirit of the appended claims forming a part hereof.

In the drawing, Fig. 1 is a central longitudinal section of a valve having one embodiment of the invention applied thereto;

Fig. 2 is a view similar to Fig. 1 showing another embodiment of the invention;

Figs. 3 and 4 are detail elevational views of certain elements respectively shown in Figs. 1 and 2; and Fig. 5 is a section taken on the line 5—5 of Fig. 2.

The structure shown in Fig. 1 is particularly designed to be associated with valve bodies having threads arranged exteriorly of the body for attaching the bonnet to the body, whereas the structure shown in Fig. 2 is designed to be associated with a valve body having the threads for connecting the bonnet with the body located interiorly of said body. The valve body shown in Fig. 1 is generally designated 10 and said body has an opening 11 through which the valve mechanism generally designated 12 is adapted to be introduced to the body. The valve body 10 is provided at the opening 11 with a threaded portion 13 with which the threads 14 of the bonnet 15 are adapted to cooperate to secure the bonnet to the body. The bonnet has a recess 16 and an opening 17, the latter being provided to receive the stem 18 of the valve generally designated 12.

A device generally designated 19 having an annular flange 20 is employed and the device is adapted to be introduced into the valve body through the opening 11 and have the flange thereof arranged in the recess 16 of the bonnet and in engagement with the material at the edge of the opening 11 so that this flange is located between the bonnet and the body of the valve and held between these portions of the valve when the bonnet is attached to the valve body. The flanged portion 20 is provided with the inclined face 21 and packing discs 22 and 23 are designed to be located between the flange 20 and the bonnet. These discs extend to the stem 18 and are apertured to receive said stem and in addition are located on opposite sides of the annular flange 24 provided upon said stem and are provided to prevent leakage between the interior of the valve body and the stem.

The valve structure herein shown is of the type which employs a non-rising valve stem and is provided with a threaded portion 25 which cooperates with an internally threaded element 26 having the valve 27 secured thereto. This threaded element 26 is provided with guide ribs respectively designated 28 and 29 which operate in longitudinally extending internally arranged recesses 30 provided in the tubular element generally designated 19 and prevent rotation of said element upon rotation of the stem. The tubular element 19 may be provided with an annular shoulder such as that designated 31 which will center the device relatively to the neck of the valve 10.

It is manifest that the structure just described provides a means capable of being associated with a valve body having external threads on the portion designated 13 to provide a valve body with a valve mechanism including a non-rising valve stem and packing discs for preventing the escape of steam or other fluid from the interior of the valve body.

The structure shown in Fig. 1 contemplates the employment of a non-rising valve stem, a threaded element 26, packing discs and a valve such as that designated 27, the latter being operable by the stem so as to adjust the valve relatively to the seat thereof. The device shown in Fig. 2 is particularly designed for association with a valve body having the interiorly arranged threads such as those designated 32 provided to connect the bonnet with the valve body. The structure generally designated 33 provides means for connecting the bonnet such as 34 with the valve body and to hold the packing discs such as 35 relatively to the body and in addition provide means in which a threaded element 26' is mounted for longitudinal movement relatively to said member 33. The member 33 corresponds in some respects to the structure shown in Fig. 1 and designated 19 in that both have an annular flange, the flange shown in the structure illustrated in Fig. 2 being designated 36 and designed to be located between the bonnet and the edge of the neck 37 of the valve body. This member generally designated 33 is provided with a portion 38 which is threaded to cooperate with the threads 32 arranged interiorly of the neck of the valve opening and in addition has the flange 36 thereof provided with threads 39 which are adapted to cooperate with the threads of the bonnet 34 to secure the bonnet to said member 33.

It will be noted that the bonnet 33 in this instance is recessed as at 40 to receive the portion of the member 33 having the threads 39 to thereby provide means to clamp the discs 35 between the bonnet and this end of the member 33. This threaded end of the member 33 is also recessed as indicated at 41 to allow flexing of the discs and is provided with guideways 42 similar in construction and function to the guideways 30.

From the foregoing description it is manifest that the arrangement just described provides means whereby the usual valve mechanism may be removed from the valve body, and regardless of whether the threads for securing the bonnet to the body are located interiorly or exteriorly of the body, a valve mechanism involving the characteristics of a non-rising valve stem or a valve stem and packing discs may be substituted for the ordinary valve mechanism without requiring removal of the body of the valve from the system in which the valve is located in order to make the change which will materially reduce expense in making the required or desired change.

Having thus described the invention, what I claim as new and desire to cover by Letters Patent is:

1. In an article of the class described, the combination of a valve body screw-threaded adjacent its upper end portion, a separable screw-threaded guide member having an opening therein mounted in the screw-threaded portion of said valve body and having a screw-threaded annular flange positioned adjacent the upper end portion of said valve body, a screw-threaded bonnet mounted on said screw-threaded flange, a plurality of guides in said opening, a valve carrying member slidable in said guides, and a valve stem extending through said bonnet and operatively related to said valve carrying member.

2. In an article of the class described, the combination of a valve body screw-threaded adjacent its upper end portion, a screw-threaded bonnet, a separable guide member screw-threaded on its outer side to engage the screw-threaded portion of said valve body and having a central opening therein, said member being mounted in said valve body between the upper end portion thereof and said bonnet and having a screw-threaded annular flange adapted to receive said bonnet, a plurality of substantially parallel guides in said opening, a valve carrying member slidably mounted in said guides, a valve stem extending through said bonnet and operatively related to said valve carrying member, said stem having an annular flange thereon, and a plurality of resilient apertured annular packing discs mounted on said stem at the respective sides of the flange formed thereon, said discs having outer edge portions secured between said bonnet and the flange of said guide member.

PAUL W. BEGGS.